April 19, 1966      F. P. ZIERDEN      3,246,382
ADAPTER FOR SEATING CARBIDE CUTTERS
Filed Nov. 13, 1964      2 Sheets-Sheet 1
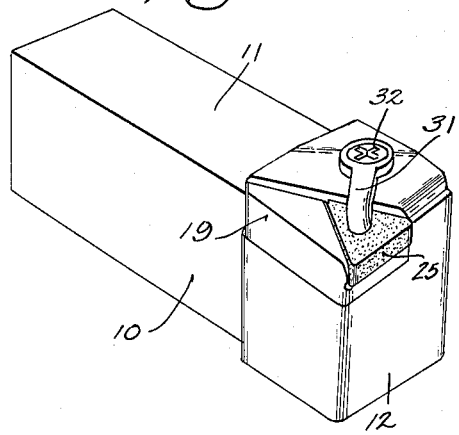
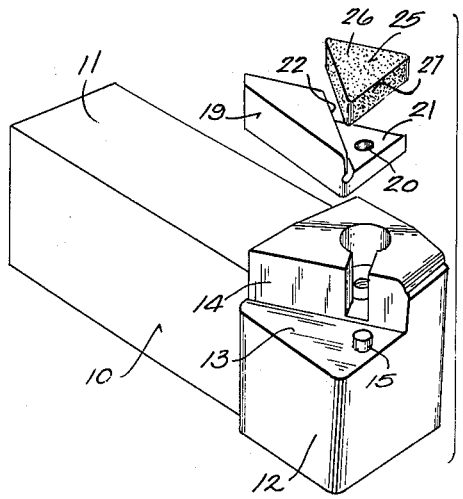
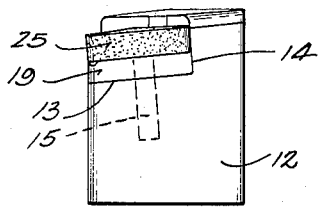
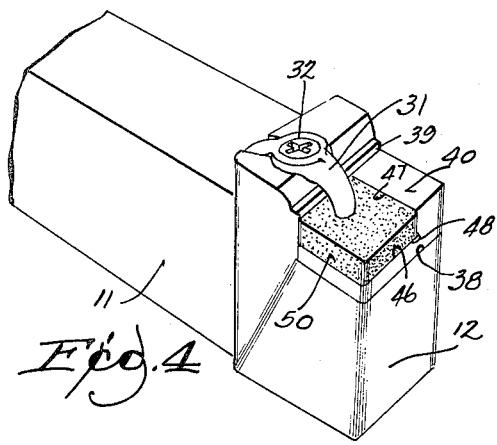
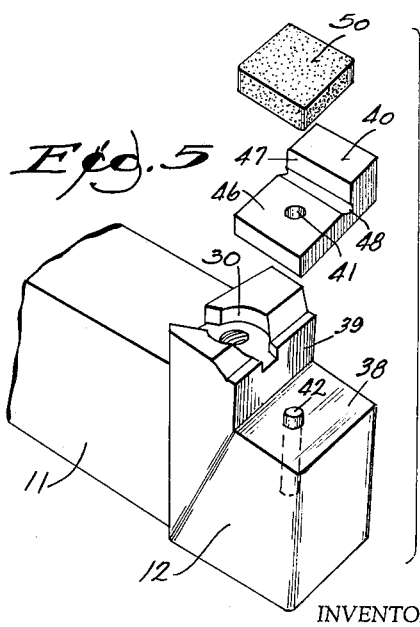
INVENTOR.
FRANK P. ZIERDEN
BY Miles Henninger
ATTORNEY April 19, 1966 F. P. ZIERDEN 3,246,382
ADAPTER FOR SEATING CARBIDE CUTTERS
Filed Nov. 13, 1964 2 Sheets-Sheet 2
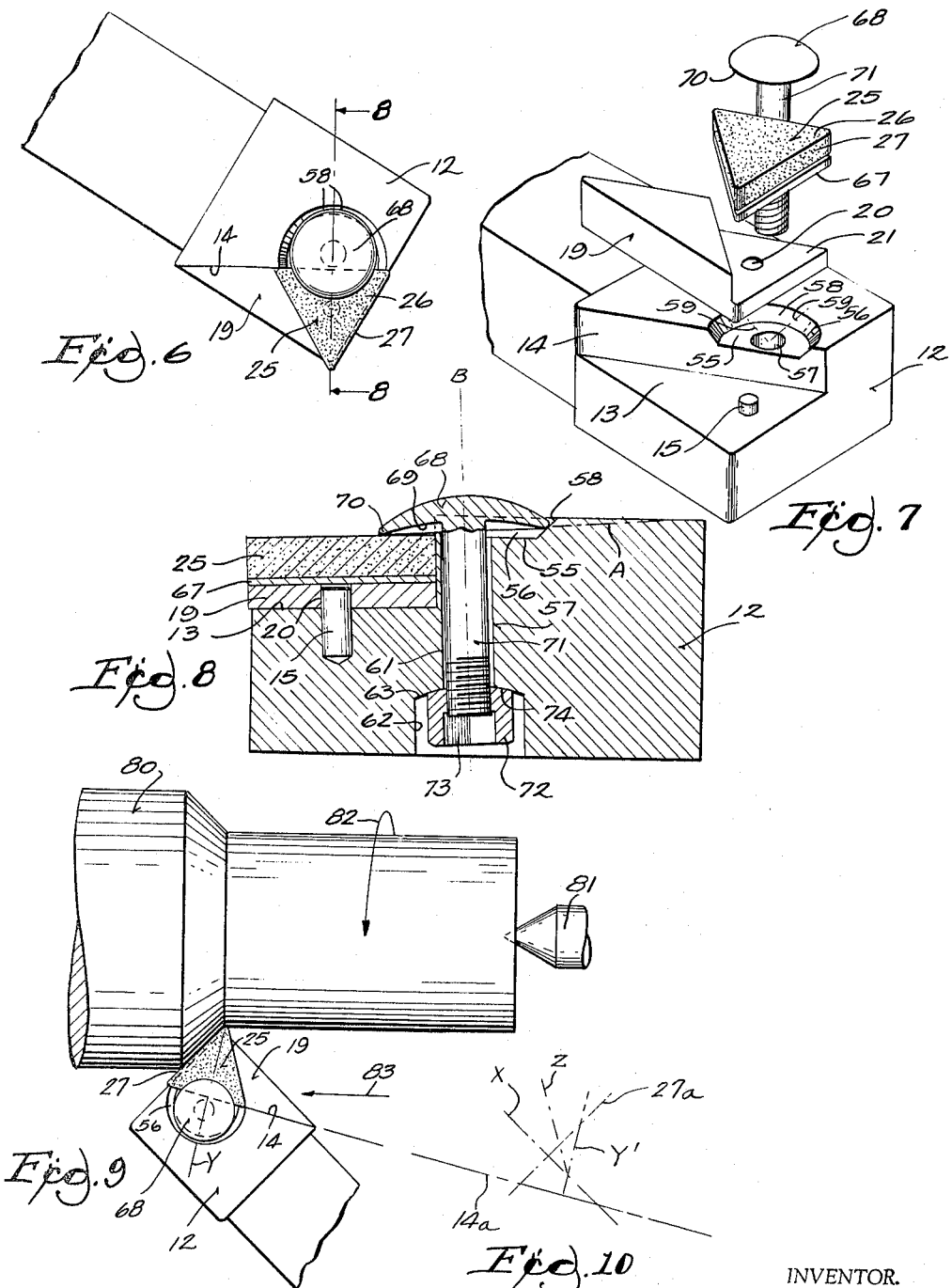
INVENTOR.
FRANK P. ZIERDEN
BY
Miles Kenninger
ATTORNEY

United States Patent Office 3,246,382
Patented Apr. 19, 1966

3,246,382
ADAPTER FOR SEATING CARBIDE CUTTERS
Frank P. Zierden, 3709 E. Allerton Ave., Cudahy, Wis.
Filed Nov. 13, 1964, Ser. No. 412,588
8 Claims. (Cl. 29—96)

This application is a continuation-in-part of Serial No. 303,860 filed August 22, 1963, and now abandoned.

This invention relates to improvements in metal working tools involving replaceable bits or cutters such as the known high speed cutters of tantalum or tungsten carbide.

Replaceable cutter bits of tantalum or tungsten carbide and the like, are molded to an exact size and shape with highly planar surfaces and with the edges of the cutters formed at precise angles providing the desired cutting edge. Heretofore, holders for replaceable cutter bits have had a pocket or recess cut into the end of the ordinary steel holder, the pocket approaching the shape and size of the desired cutter as nearly as can be done with known methods for machining such recesses. The surfaces intended to position and seat the cutter on the holder, should be highly planar and fully co-extensive with the bit surfaces seating thereon, for uniformly resisting both the cutting pressure downwardly and lateral thrusts on the cutter. The angles receiving the edges of the cutter must conform exactly to the cutter edges to avoid pressures causing cutter breakage.

Obviously, it is difficult to mill or otherwise form pocket-like seats into the ends of the holder to provide recesses of the exact shape and size of a metal working cutter and with both the holder seating and back-up surfaces sufficiently planar and the angles sufficiently precise to match the surfaces of the cutter to be supported in the recess and to provide uniform support over the entire cutter surfaces bearing on recess surfaces and without excessive pressure on the cutting edges seating in the holder angles. Another difficulty has been to place the recesses so that the cutting pressure (which increases as the cutter becomes duller) is always exerted on a part of the tool holder which gives way at a maximum pressure below that at which the cutting edge crumbles and which avoids damaging of the seat member. The lateral thrusts of the cutter (which also increase as the cutter becomes duller) should also be entirely transmitted by the holder from the seating member.

The present invention provides a tool in which a holder receives a replaceable seat member and a carbide cutter rests on the seat member and is backed up in part by a holder vertical surface and in part by a seat member vertical surface. The holder part of the tool provides a head and a shank, the head having a cut made by a "through pass" involving at least two sides of the head as compared to the prior employment of end milling and the like involving a cut into the holder through only one surface. The present "through pass" head cut thus provides a horizontal surface and a vertical surface of the holder which can both be easily finished to a high degree of planeness and which are at any desired angle to one another.

A seat member is then provided which is to rest on and in the cut made in the head member and the seat member has a cut also through at least two sides thereof, providing a horizontal and a vertical surface by a "through pass" cut. The seat member "through pass" cut surfaces are also easily finished substantially planar and at any desired angle to one another. The cutters themselves are molded to a high degree of planeness and adjacent surfaces are at a given exact angle to one another to form the cutting edges and the juncture of the seat member surfaces is relieved to assure relieving the edges of a cutter from pressure. Hence the cutter fits closely into the recess formed by cooperation of the cut surfaces in the holder head and in the seat member.

The present tool provides for "through pass" machining which permits grinding both the horizontal and vertical surfaces of both the holder and the seat member to any desired degree of planeness and angle between surfaces. The exact angles between the horizontal and vertical cutter surfaces are formed between the horizontal seat and the vertical back-up surfaces of the recess for maximum contact with and support of the cutter against cutting pressure and lateral thrust. More substantial back-up surfaces are provided than heretofore and they are in better relation to the active cutter edge with one back-up wall formed in the seat member and another back-up wall being part of the holder. Any damage to any recess surface is readily repaired. The two back-up walls are so related that lateral cutter thrust is applied largely to the seat member. A shear pin positions the seat member on the holder member and breaks when dulling of a cutter edge increases cutting pressure and lateral thrust, beyond the shear strength of the pin.

The invention also contemplates a modified form of cutter clamping means shaped as a bolt having a relatively large circular head bearing on relatively small areas on the cutter and the holder, the holder clamp bearing area compensating for variation in height of the cutter top surface above the cutter seating surface. Such bolt clamp is made in a screw machine and is therefore at practically minimum cost. The bolt head is of a size to provide substantial bearing areas other than those bearing on the holder and cutter at any one time so that other bolt head areas may be brought into use if the prior bearing areas are damaged. The clamp head can be relatively thick without increase in maximum thickness of the tool portion close to the workpiece and there is no place on which chips can be caught.

In the drawings:

FIG. 1 is a perspective of a tool of the present invention for receiving a triangular replaceable cutter of the cemented carbide type mentioned above.

FIG. 2 is an end view of the tool shown in FIG. 1.

FIG. 3 is an exploded perspective view to show individual parts of the tool of FIGS. 1 and 2, in the relationships assumed thereby as the tool is assembled.

FIG. 4 is a perspective of a tool similar to FIG. 1 but modified to accommodate a rectangular replaceable cutter bit.

FIG. 5 is an exploded view similar to FIG. 3 of the tool with a rectangular cutter.

FIG. 6 is a top plan view of a tool with a modified form of the means for clamping a cutter on a tool portion for holding the cutter.

FIG. 7 is an exploded perspective view, similar to FIGS. 3 and 5 of the tool shown in FIG. 6.

FIG. 8 is a cross sectional view on the plane of line 8—8 of FIG. 6.

FIG. 9 is a diagram showing the relative positions of a present tool to a workpiece, and the respective directions of the cutting pressure and the lateral thrust acting on the cutter, and FIG. 10 is a diagram showing the directions of forces acting on the shear pin during use of a triangular cutter.

Referring to the drawing by numbered parts, 10 is a tool portion which serves as a holder for other parts and includes a shank 11 and a head 12, and which is preferably made from a high quality and hardened steel. The shank 11 is of substantial size and substantially square or rectangular in cross section so that it may be firmly held in a tool post or the like on a machine tool. The head 12 may extend above the top and laterally from one or more side surfaces of the shank to provide a mass of metal having the same transverse strength as the shank even when the head is cut as required for receiving other parts of the tool. The tool head 12 is cut in a "through pass" by any known means, to form a horizontal surface 13 and a vertical surface 14. The size or kinds of machine tools used to form the head surfaces 13 and 14 is greatly extended beyond the usual end milling method, and these surfaces can be planar to any desired degree and at any required angle to one another. There is no overcutting of the tool for only the purpose of allowing entry or reversal of the cutting tool to make a sharp corner. The tool head horizontal surface 13 is provided with a hole to receive a pin 15 extending upwardly from such surface.

A seat member 19 is preferably made of a high speed type of steel which will retain its shape and size at "carbide" cutting temperatures and which is shaped to occupy the head surface 13 when a hole 20 through the seat member 19 receives the pin 15. The seat member 19 is cut to provide a horizontal surface 21 and a vertical surface 22 at a given angle to the surface 21. Both surfaces 21 and 22 can be made to any desired degree of planeness and the angle between them can be made as desired because both of such surfaces are accessible from at least two sides of the seat member for "through pass" machining. The height of the surface 22 above the surface 21 is approximately the thickness of a carbide cutter 25 and its length is substantially the length of the side of the carbide cutter bit 25.

The vertical surfaces 14 and 22 respectively form back-up walls receiving the lateral thrust. The cutter 25 has upper and lower surfaces 26 and side surfaces 27 and is so made that opposite surfaces are substantially plane and parallel, and so that adjacent surfaces 26 and 27 define a desired cutting edge. When the seat member is placed on the tool head, it will be seen that the surfaces forming the recess in which the cutter is to be received are at the desired angles to one another. So long as the acting edge of cutter 25 is sharp, there is relatively little thrust on seat member wall 22. However as a cutting edge becomes dull, more and more lateral thrust is imposed on seat back-up wall 22 and through the seat member on holder back-up wall 14. Dependent on the strength of pin 15, the pin will shear before sufficient thrust is put on seat member surface 22 to deform it and spoil the fit of the cutter in its recess. The head 12 is formed at 30 to receive a portion of clamp 31 and a screw 32. The clamp is adapted to bear on the cutter to hold it against forces tending to lift it out of its seat.

When a "square" cutter is to be used, the tool head 12 is cut at a desired angle to the center line through the tool shank 11. A horizontal rectangular seating surface 38 is thus obtained, and a vertical back-up surface 39 is obtained at an angle to the surface 38. There are no limitations on the size of the tool for cutting such surfaces or on the degree of planeness thereof or on the exactness of the angle between the surfaces because such surfaces are accessible from three sides, and any known "through pass" method for cutting flat surfaces may be employed. The horizontal surface 38 on the tool head receives a seat member 40 of generally rectangular form which is provided with a hole 41 to receive a pin 42 extending from the tool head surface 38, and which has a vertical back-up surface 47 originating at and extending upwardly from the horizontal seating surface 46. At the juncture of the seat member surfaces 46 and 47, clearance is provided to receive, without damage or interference, one of the cutting edges of the bit as by slight undercutting as shown at 48. A hole 30 receives a clamp 31 and a screw 32 as was described above.

Then the seat member 40 is in place, a square cutter 50 bears against the vertical head surface 39 as the back-up surface and the seat member surface 47 as the back-up surface. The height of the seat member surface 47 is equal to or only slightly less than the thickness of the cutter 50 so that the cutter is adequately supported against the lateral thrust. The head surface 39 extends sufficiently upwardly from surface 38 to provide back-up support for both seat member 40 and cutter 50. The shifting of lateral thrust as a cutter edge becomes dull, is as described above and the shear pin 42 prevents imposing thrust on surface 47 beyond the strength of the seat member to resist such thrust.

Referring to FIGS. 6–9, the tool holder head 12 is modified to provide a recess 55 with an arcuate and downwardly generally sloping (e.g., 45°) wall 56 about a hole 57 substantially tangent to the head vertical surface 14. The wall 56 has a portion 58 thereof between the radii 59 from the center of the hole 57 such that wall 56, as a whole, is conically eccentric with and slopes toward the hole 57. End portions of the wall 56 are arcuate outwardly from the wall area 58 and are on progressively larger radii from the radii through the center of the hole than the radius 59 shown. The hole 57 extends all the way through the tool holder head 12 and has an upper generally cylindrical portion 61 of one diameter and a lower portion 62 thereof of larger diameter than the upper hole portion 61 and the wall 63 between the upper and lower wall portions is spherical. In FIG. 8, a shim 67 is shown for bringing the upper surface of cutter 25 into the plane of recess 55, if a relatively thin cutter is used.

A clamp is now made in the form of a bolt with a circular head 68 having an undercut lower surface 69 so that the edge 70 of the head extends below the balance of the lower head surface. Thus is the bolt 68–70 were drawn up against a flat surface, only the edge 70 would bear on such surface. The bolt shank 71 is cylindrical and partially threaded to receive a nut 72 having an angular socket 73 therein from one end of the nut, to receive a wrench. The diameter of the bolt shank 71 and the outer diameter of nut 72 are each substantially smaller than their respective hole portions 61 and 62 and the nut is seated by way of its spherical surface 74, when the nut is drawn up to bring the edge of the bolt head into bearing engagements on the surfaces opposite to the edge.

The bolt head 68 is of a size to have a small portion of the edge 70 bearing on the holder recess eccentric wall portion 58 while the remainder of the bolt head edge is free from the arcuate wall portions 56, and to have a small portion of the edge 70 bearing on the top surface of the cutter 25. Such bearing takes place because the bolt head portion slides down on the recess wall portion 58 until the bolt head edge 70 bears on cutter 25. Then as the nut 72–74 is drawn up, the bolt tilts and its head presses on both the recess wall area 58 and on the cutter top surface 26. The tilting is clearly shown by the fact that a line A perpendicular to the center line B of the bolt, is not parallel to the holder upper surface. Because only small areas of the bolt head edge act on the surfaces 58 and 26, the bolt may be turned to many positions to provide fresh bearing areas in case former edge bearing areas become unsatisfactory. Obviously the bolt head may be made as heavy as desired and the circular domed shape is inherently strong. Use of a bolt such as described above, for clamping the cutter on the seat member or in the tool holder seat, accommodates much better to variations in cutter thickness than is the case with the clamps of FIGS. 1 and 4.

FIG. 9 shows a workpiece 80 mounted in a lathe chuck (not shown) and supported on a lathe center 81 for turning in the direction of the arrow 82. A cut is to be taken by the present tool moving in the direction of the arrow 83. In FIG. 10, the tool holder surface 14 is extended as line 14a and line 27a is drawn parallel to the cutter surface 27 and intersecting line 14a. The lateral thrust of the cutting edge is represented by line X perpendicular to line 27a while the lateral thrust of the cutting point is represented by line Y perpendicular to line 14a. It will be seen from the resultant Z of forces X, Y that the pressure is largely transferred to holder surface 14 and that only a portion of such resultant force has to be resisted by the shear pin 15. Because the bolt head can be heavier than prior clamps, it holds better than was possible by use of the known prior clamps, and keeps the cutter firmly on the seat, the pin 15 is never subjected to anything but a shearing effect and can be smaller than was previously the case. Being only in shear, it is possible to calculate the maximum allowable force on the pin and thus secure shearing thereof well before the cutter or the seat member can possibly be damaged.

I claim:

1. A metal working tool comprising a holder having a through pass cut from its upper head surfaces and from an end for forming a seat and having an upper surface sloping toward an upper planar surface adjacent the seat, a cutter seating in the holder head cut to provide an upper surface substantially co-planar with the holder planar surface, the holder seat providing a back-up surface for supporting a cutter edge surface thereon, the holder having a hole therethrough with an upper portion extending from the holder planar surface and being of smaller diameter than a lower portion extending from a holder lower surface, and a bolt-like clamp consisting of a head for edge bearing thereof on the holder sloping upper surface and on the cutter upper surface and of a shank extending through the hole upper portion and having a threaded portion extending into the hole lower portion and of a nut threaded on the shank to bear against a wall surface of the hole for drawing the clamp head against the holder sloping surface and the cutter upper surface, the clamp shank and nut being smaller in diameter respectively than the upper and lower hole portions for tilting of the clamp head relative to the holder and cutter surfaces supporting the clamp head as the clamp shank and nut tilt in their hole portions.

2. The metal working tool of claim 1 in which a recess in the holder upper surface provides a surface co-planar with the cutter upper surface and a surface sloping toward the seat and the clamp head is circular for bearing of head edge areas on the sloping head recess surface and the cutter upper surface.

3. The metal working tool of claim 1 in which a recess extending from the holder head upper surface has an arcuate side wall sloping toward the seat and the clamp head is circular for bearing thereof on only a limited area of the recess arcuate wall and on the cutter upper surface.

4. The metal working tool of claim 1 in which a recess extending from the holder upper surface has an arcuate side wall sloping toward the seat and with a portion of the wall conical and eccentric relative to the center of the hole and the clamp head is circular and has an undercut bearing side for bearing only of the clamp head edges on the conical concentric recess wall portion and on the cutter upper surface.

5. The metal working tool of claim 1 in which the holder hole is spaced from the holder surface for supporting a cutter edge surface whereby upon tilting of the clamp shank in the hole the shank surface is kept out of contact with the cutter.

6. The metal working tool of claim 1 in which a surface joining the upper and lower hole portions is spherical and an end of the clamp nut is spherical for bearing thereon.

7. The tool holder of claim 1 in which the tool holder head has a recess with arcuate downwardly sloping wall extending partially about a hole substantially tangent to the vertical head surface, the recess having a central wall portion between spaced radii from the center of the hole to form a conical surface eccentric with the hole and having an edge portion of the clamp head on the recess central wall portion and on the cutter upper surface.

8. The tool holder of claim 7 in which both diameters of the hole are larger than the diameter of the bolt shank for tilting of the bolt upon bearing of a portion of the bolt head edge on the recess central hole portion and on the cutter upper surface upon bearing of a spherical surface of the nut on a spherical surface of the larger diameter hole.

References Cited by the Examiner

UNITED STATES PATENTS

| | | | |
|---|---|---|---|
| 2,848,789 | 8/1958 | Friedline | 29—96 |
| 2,883,737 | 4/1959 | Wilson | 29—96 |
| 2,949,662 | 8/1960 | Cook | 29—96 |
| 3,104,452 | 9/1963 | Greenlead | 29—96 |

WILLIAM W. DYER, JR., *Primary Examiner.*

HARRISON L. HINSON, *Examiner.*